United States Patent
Narasimhamurthy

(10) Patent No.: US 9,929,968 B2
(45) Date of Patent: Mar. 27, 2018

(54) INTER-LAYER COMMUNICATION OF EVENTS BETWEEN TCP LAYER AND HIGHER LAYERS WHEN IMPLEMENTED IN DIFFERENT CONCURRENT EXECUTION ENTITIES

(71) Applicant: Oracle International Corporation, Redwood Shores, CA (US)

(72) Inventor: Giridhar Narasimhamurthy, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 427 days.

(21) Appl. No.: 14/662,270

(22) Filed: Mar. 19, 2015

(65) Prior Publication Data

US 2016/0277478 A1    Sep. 22, 2016

(51) Int. Cl.
*G06F 17/30* (2006.01)
*H04L 12/863* (2013.01)
*H04L 29/06* (2006.01)

(52) U.S. Cl.
CPC ............. *H04L 47/50* (2013.01); *H04L 69/16* (2013.01); *H04L 69/162* (2013.01)

(58) Field of Classification Search
CPC ......... H04L 29/02; H04L 67/06; H04L 69/16; H04L 47/50
USPC ................ 709/207, 213, 202, 227–229, 217; 370/328, 392, 231, 235
See application file for complete search history.

(56) References Cited

U.S. PATENT DOCUMENTS

| | | | |
|---|---|---|---|
| 6,216,173 B1* | 4/2001 | Jones | G06F 9/4812 709/202 |
| 6,279,041 B1* | 8/2001 | Baber | H04L 47/10 370/235 |
| 6,477,590 B1* | 11/2002 | Habusha | H04L 47/10 379/229 |
| 6,532,211 B1* | 3/2003 | Rathonyi | H04L 1/0006 370/230 |
| 6,640,248 B1* | 10/2003 | Jorgensen | H04L 1/20 370/328 |
| 6,817,018 B1* | 11/2004 | Clarke | G06F 9/466 714/E11.13 |
| 6,940,813 B2* | 9/2005 | Ruutu | H04L 29/06 370/231 |

(Continued)

*Primary Examiner* — Frantz Coby
(74) *Attorney, Agent, or Firm* — IPHorizons PLLC; Narendra Reddy Thappeta

(57) ABSTRACT

Inter-layer communication of events between different concurrent execution entities, where a Transmission Control Protocol (TCP) layer instance executes in a first execution entity and a higher layer instance executes in a second execution entity. In an example transaction, the first execution entity receives a TCP packet, and the TCP layer instance in the first execution entity generates an event message by processing the received TCP packet. The TCP layer instance thereafter stores the event message in an event queue at the second execution entity. The second execution entity identifies the presence of the event message in the event queue (e.g., by polling) and updates a first data structure, subsequent to the processing of the event message by the higher layer instance in the second execution entity. In an embodiment, the updated first data structure corresponds to application control block (ACB) maintained for each TCP connection.

20 Claims, 9 Drawing Sheets

(56) References Cited

U.S. PATENT DOCUMENTS

| | | | |
|---|---|---|---|
| 7,349,337 B1 * | 3/2008 | Mahdavi | H04L 47/193 370/230.1 |
| 2003/0101128 A1 * | 5/2003 | Abernethy | G06Q 40/04 705/37 |
| 2013/0250958 A1 * | 9/2013 | Watanabe | H04L 45/54 370/392 |
| 2016/0021171 A1 * | 1/2016 | Zourzouvillys | H04L 67/10 709/207 |

* cited by examiner

TCB100

| Address | RSS Queue Number | Pointer to ACB | Application ID | App-Snd-Buf | Snd-Buf |
|---|---|---|---|---|---|
| 100 | 0001 | 200 | AID001 | | |
| 425 | 430 | 435 | 440 | 445 | 450 |

*FIG. 4*

ACB200

| Address | RSS Queue Number | Pointer to TCB | Application ID | Buffer |
|---|---|---|---|---|
| 200 | 0002 | 100 | AID001 | |
| 525 | 530 | 535 | 540 | 545 |

*FIG. 5*

INTER-LAYER COMMUNICATION OF EVENTS BETWEEN TCP LAYER AND HIGHER LAYERS WHEN IMPLEMENTED IN DIFFERENT CONCURRENT EXECUTION ENTITIES

BACKGROUND OF THE DISCLOSURE

Technical Field

The present disclosure relates to network communications, and more specifically to inter-layer communication of events between Transmission Control Protocol (TCP) layer and higher layers when implemented in different concurrent execution entities.

Related Art

Internet protocol (IP) generally defines mechanisms for providing a unique address to each machine connected to the world-wide-web (WWW), and also for routing datagrams to destination systems having respective assigned IP addresses. As is well known, version 4 of IP (IPv4) has been prevalent, while version 6 (IPv6) has also been used lately. In general, IP provides for unreliable delivery of datagrams in that the delivery of each datagram is not ensured by operation of IP alone.

Transmission Control Protocol (TCP) is a protocol built on top of IP, for providing reliable delivery of a stream of bytes. Normally, the TCP of a source system includes up to a certain number of sequence of bytes in each datagram, and causes IP to send the datagram. The bytes may be ordered and numbered such that the TCP at the other end can request retransmission of any missing bytes not received due to packet loss during transmission on the WWW. TCP thus operates to provide reliable transport for a stream of bytes from a source system to a destination system.

TCP is said to be a higher layer compared to IP since IP may be viewed as providing a function, utility or service to TCP. There are higher layers on top of TCP as well. Examples of such layers include application layer, encryption layer, and socket layer, as is well known in the relevant arts. Such higher layers operate on top of and use the services provided by TCP for sending and receiving of data.

Typically, the interaction between TCP and higher layers is enabled by event messages, which may indicate specific states of interest attained in the communicating layer or request an action of the receiving layer. For example, a TCP layer may indicate completion of setting of a connection to a higher layer or availability of additional data received from a remote system. On the other hand, a socket layer may request data to be sent on an existing connection.

Concurrent execution entities are provided in enterprises for reasons such as scalability, higher throughput performance, availability, etc. Examples of such execution entities includes threads, processes, etc. These execution entities execute concurrently implying, each entity can continue to perform processing operations in parallel and independent of the other entities. Often such execution entities are executed on corresponding processors of a multi-processor system, though concurrent processing can be obtained on a single powerful processor as well.

There may be a need to execute TCP logic in one execution entity and higher layers in other execution entities, as related to a specific TCP stream of data. Aspects of the present disclosure address inter-layer communication of events when TCP layer is implemented in one concurrent execution entity and higher layers are implemented in another concurrent execution entity.

BRIEF DESCRIPTION OF THE DRAWINGS

Example embodiments of the present disclosure will be described with reference to the accompanying drawings briefly described below.

FIG. 4 illustrates the format of a TCB block, in an embodiment of the present disclosure.

FIG. 5 illustrates the format of an ACB block, in an embodiment of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for communication of events between different concurrent execution entities, where a Transmission Control Protocol (TCP) layer instance executes in a first execution entity and a higher layer instance executes in a second execution entity. In an example transaction, the first execution entity receives a TCP packet, and the TCP layer instance in the first execution entity generates an event message by processing the received TCP packet. The TCP layer instance thereafter stores the event message in an event queue at the second execution entity. The second execution entity identifies the presence of the event message in the event queue and updates a first data structure, subsequent to the processing of the event message by the higher layer instance in the second execution entity.

According to another aspect of the present disclosure, the second execution entity identifies the presence of the event message by way of polling the event queue for incoming event messages. Further, for each TCP connection, a corresponding application control block (ACB) and a transmission control block (TCB) are maintained by respective socket and TCP layers such that the updated data structure corresponds to the ACB (of the TCP connection on which the TCP packet is received) without having to implement a lock on any of the ACB data structures.

According to one more aspect of the present disclosure each execution entity is designed to process the events generated by the TCP layers (either within the execution entity or other execution entities) in a 'run-to-completion' model, implying that the event is processed corresponding to all the higher layers (e.g., socket and application) before the next event is selected for processing. As a result, the features may be particularly suited in environments where the higher layers are desired to be implemented without requiring support of operating system primitives such as interrupts or blocking semantics associated with synchronous implementations.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1A:
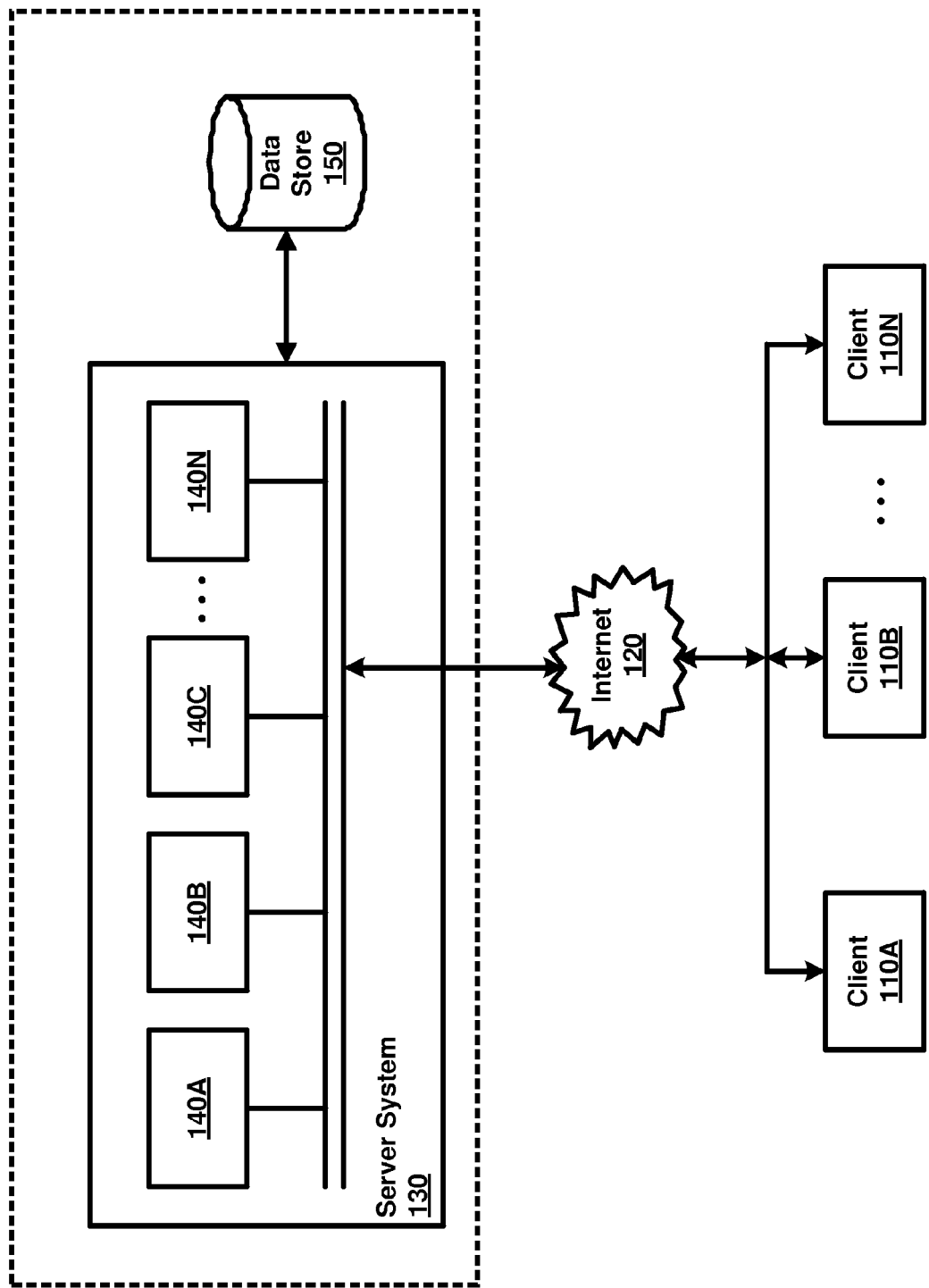
FIG. 1A is a block diagram illustrating an example environment in which several aspects of the present disclosure can be implemented.

FIG. 1A is a block diagram illustrating an example environment in which several aspects of the present disclosure can be implemented. The block diagram is shown containing server system 130, data store 150, Internet 120, and client systems 110A-110N. Server system 130 and data store 150 are provided within an enterprise (shown with dotted boundaries).

Merely for illustration, only representative number/type of systems are shown in the Figure. Many environments often contain many more systems, both in number and type, depending on the purpose for which the environment is designed. Each system/device of FIG. 1A is described below in further detail. Aspects of the present disclosure facilitate scalable architecture to serve TCP connections, as described below with examples.

Each of client systems 110A-110N represents a system such as a personal computer, workstation, mobile station, mobile phones, computing tablets, etc., used by users to send user requests to applications executing on server system 130, and receive the corresponding responses generated by such applications, via server system 130. The requests and responses may be transmitted on TCP connections.

Internet 120 represents a network providing connectivity between client systems 110A-110N and server system 130. Internet 120 may be implemented using Internet Protocol (IP), well known in the relevant arts. In general, in internetworking environments, an IP packet (containing a datagram) is used as a basic unit of transport, with the source address being set to the IP address assigned to the source system from which the packet originates and the destination address set to the IP address of the destination system to which the packet is to be eventually delivered.

In the example of user request from a client system 110A-110N to the server system 130, the source address would be set to the IP address of the requesting source system (i.e., one of source systems 110A-110N), and the destination address would be set to the IP address of server system 130, such that the requesting packet is eventually delivered to the destination (server system 130) by Internet 120.

When the packet contains content such as port numbers, which specifies the destination application, the packet may be said to be directed to such application as well. The destination system may be required to keep the corresponding port numbers available/open, and process the packets with the corresponding destination ports. In general, the combination of a source IP address, destination IP address, source port number and destination port number specifies a unique TCP connection.

Data store 150 represents a non-volatile (persistent) storage facilitating storage and retrieval of data by applications executing in other systems of the enterprise such as server system 130. For example, data store 150 may be implemented to store data, which would be of interest to end-users sending user requests while operating client systems 110A-110N. Data store 150 may be implemented, for example, based on Relational Database Management System (RDBMS) or a file system.

Server system 130 executes (or hosts) applications that process user requests (e.g., requests for data) received from client systems 110A-110N, while potentially operating on the data stored in back-end databases such as data store 150. Each application within server system 130 may be implemented as one or more application instances on corresponding processors, executing concurrently within server system 130 and processing data requests. The output generated by such processing may be provided to end-users on client systems 110A-110N and/or stored again in data store 150. Server system 130 provides various software infrastructure elements for execution of such applications and application instances.

Server system 130 is shown containing processors 140A-140N. Processors 140A-140N represent the number of central processing units (CPUs) seen by the operating system contained in server system 130. For example, each of the processors 140A-140N may correspond to different physical CPUs or different "logical" CPUs within a single CPU. Software infrastructure provided within server system 130 may enable the operating system to see such multiple "logical" CPUs, as is well known in the relevant arts (e.g., hyper-threading technology).

Processors 140A-140N may provide concurrent execution entities (e.g., threads) that process user requests. The user requests may originate from an application instance executing in an execution entity or from external systems directed towards the application instance. The user requests may be sent/received in the form of TCP packets on TCP connections mapped to the execution entity processing the request. The application instances need support from various lower level layers, as described below in an example scenario.

Figure 1B:
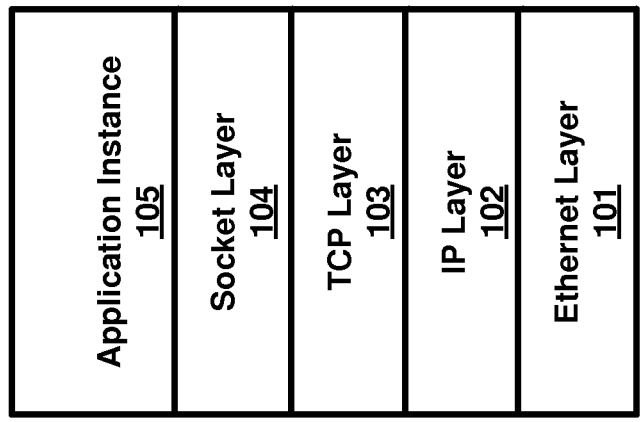
FIG. 1B depicts the various layers that may be required in an embodiment of the present disclosure.

FIG. 1B depicts the various layers that may be required to be supported for appropriate processing of user requests. The layers are shown containing application instance 105 (containing application instances), a socket layer 104 (containing sockets), a TCP layer 103 (containing the TCP logic), an IP layer 102 (for processing IP packets), and Ethernet layer 101. Ethernet layer 101 represents the lowest layer and application instance 105 represents the highest layer.

According to an aspect of the present invention, server system 130 is implemented to process many TCP connections such that application instances bound to a particular execution entity can send and receive packets to/from client systems 110A-110N using TCP logic implemented on other execution entities in the system. In several environments, it may be desirable that server system 130 is configured such that inter-layer communications between the execution entities of server system 130 are scalable to accommodate large number of TCP connections.

3. Interlayer Communication

Figure 2:
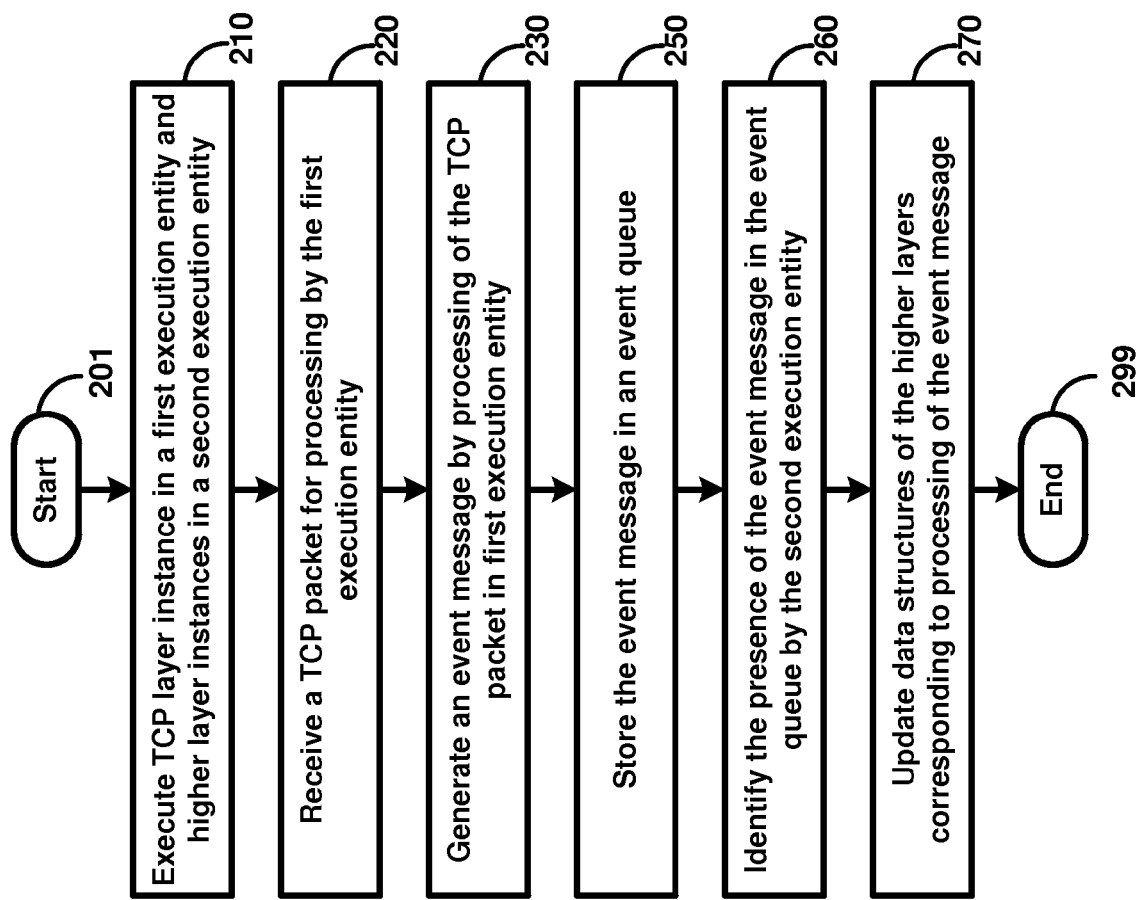
FIG. 2 is a flow chart illustrating the manner in which data packets received on TCP connections are processed, according to an aspect of the present disclosure.

FIG. 2 is a flow chart illustrating the manner in which events related to TCP connections are processed, according to an aspect of the present disclosure. The flowchart is described with respect to the systems of FIGS. 1A and 1B, in particular, server system 130, merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, server system 130 executes a TCP layer instance in a first execution entity and higher layer instances in a second execution entity. For example, assuming that each execution entity corresponds to a thread, a first thread may execute software code implementing the TCP layer, while another thread may execute software code representing the higher layer instances (e.g., socket layer and application layer).

In step 220, the first execution entity receives a TCP packet for processing. Generally, TCP packets are generated after earlier processing by lower layers (e.g., IP, Ethernet) or higher layers (e.g., application, socket). For the purposes of this flow chart, it is assumed that a TCP packet is received by the first execution entity after earlier processing by lower layers of the same execution entity.

In step 230, the first execution entity generates an event message by processing the TCP packet received in step 220. The type of the event message generated depends on the state of the TCP connection, as well as any user data that is requested to be delivered to the application instance at the higher layer instance. The states of the TCP connection are described in a document entitled, "RFC: 793 Transmission Control Protocol DARPA Internet Program Protocol Specification", dated September 1981.

In step 250, the first execution entity stores the event message in an event queue. The event queue needs to be supported by appropriate memory storage (in registers, random access memory, etc.) to buffer the event messages for further processing as described below.

In step 260, the second execution entity identifies the presence of the event message in the event queue. Identifying the presence of the event message may be accomplished by polling the event queue for incoming event messages.

In step 270, the second execution entity updates data structures corresponding to the higher layer instances further to the processing of the event message. Updating of data structures implies a write operation on the data structures corresponding to the TCP connection on which the TCP packet is received in step 220. The flow chart ends in step 299.

As may be appreciated, since there are no shared data structures between the TCP layer instances on different execution entities and the higher layer instances on the second execution entity for purpose of write operation, the flow chart of FIG. 2 can be implemented without locks, thereby enhancing the throughput performance of server system 130.

The features described above with respect to FIG. 2 can be implemented in various embodiments, as will be apparent to one skilled in the relevant arts by reading the disclosure provided herein. The description is continued illustrating the set up of the exemplary embodiment in support of the further description below.

4. Server System—General Features

The execution entities described above are characterized in that each can be scheduled for execution and be managed (suspended and resumed, etc.) independently by the operating system contained in server system 130. The execution entities can be executed in parallel, for example, by a time-sliced execution of threads, and/or on multiple independent processors executing respective threads.

As noted above, any number of concurrent execution entities can be executed on a single powerful processor. However, in an example embodiment (which is described in further detail in sections below as well), one concurrent execution entity is executed on a corresponding processor of a multi-processor system. In the example embodiment, each execution entity implements at least the application instance 105, socket layer 104, and a TCP layer 103 (in a run-to-completion model), though alternative embodiments can execute some of these layers in one processor, while executing other layers in other processors.

In the run-to-completion model, the execution entity selects a data packet delivered by IP layer 102, and thereafter performs the processing on the data packet corresponding to all these higher layers, including the application instance. The next data packet is selected for processing only after completion of processing of the data packet by the application instance 105 as well.

However, in an embodiment, a single application instance may be supported by concurrent/parallel execution on different execution entities based on code that is re-entrant (i.e., code that can be partially executed by one execution entity, and continued in the same or different execution entity and yet complete the original execution). Such concurrent execution of the same application on different execution entities is beneficial for reasons such as scalability.

The description is continued illustrating the detailed architecture of some of the components of server system 130, in one embodiment.

5. Detailed Architecture

Figure 3:
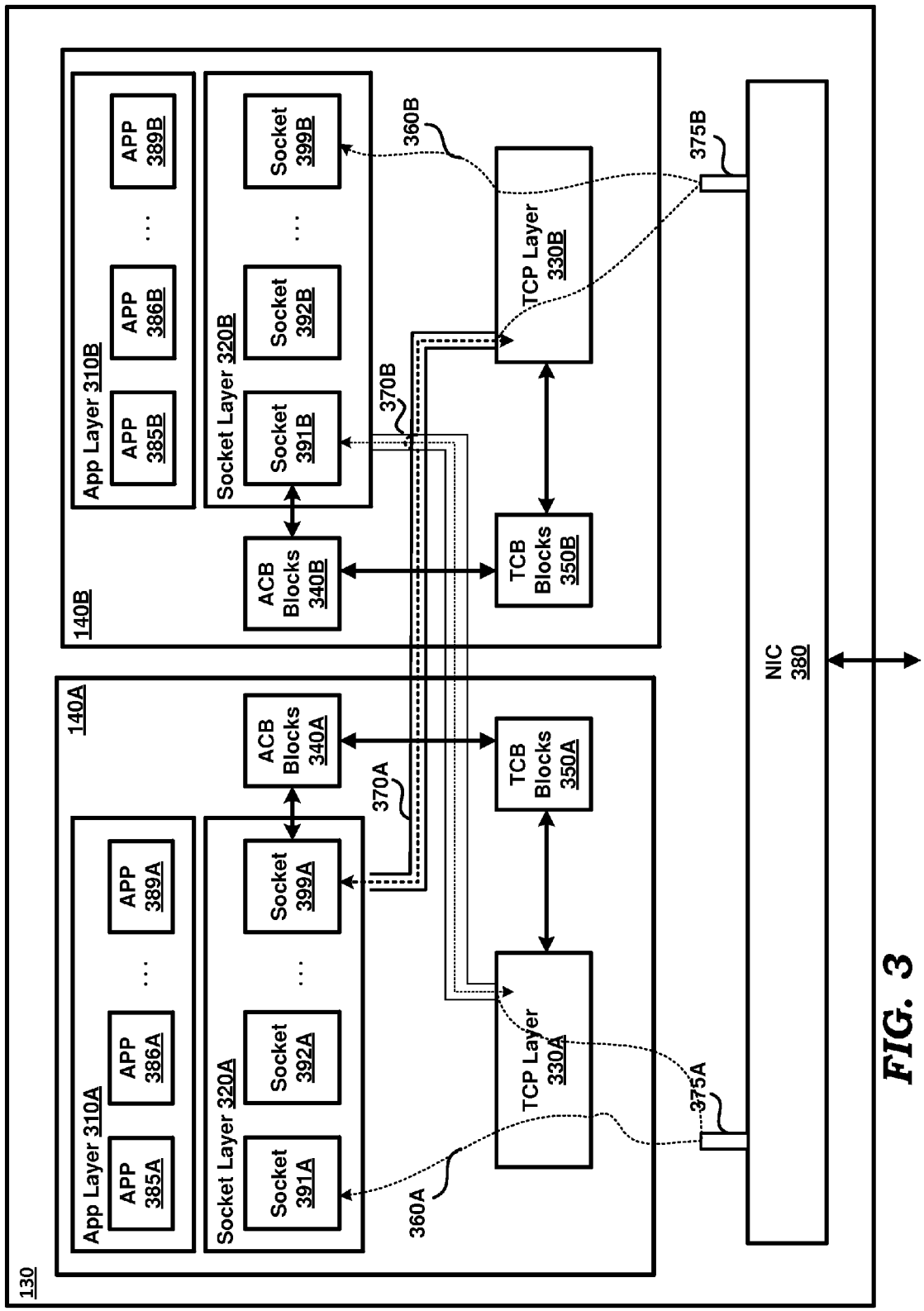
FIG. 3 is a block diagram illustrating the architecture of some of the components of a multiprocessor server system, in an embodiment of the present disclosure.

FIG. 3 is a block diagram illustrating the hardware/software architecture of some of the components of server system 130 further in accordance with the general features noted above, in one embodiment. Server system 130 is shown containing processors 140A and 140B, and NIC 380, each implemented as a hardware block supported by appropriate software. Each block of FIG. 3 is described below in further detail.

Processors 140A and 140B together provide a multi-processing environment for application instances executing in server system 130. Processor 140A is shown containing app layer 310A (with application instances 385A-389A), socket layer 320A (with sockets 391A-399A), ACB blocks 340A, path 360A, event queue 370A, TCP layer 330A, and TCB blocks 350A. The combination of app layer 310A, socket layer 320A, and TCP layer 330A is implemented (executed) in one execution entity, as noted above.

Similarly, processor 140B is shown containing app layer 310B (with application instances 385B-389B), socket layer 320B (with sockets 391B-399B), ACB blocks 340B, path 360B, event queue 370B, TCP layer 330B, and TCB blocks 350B. The combination of app layer 310B, socket layer 320B, and TCP layer 330B is implemented in a second execution entity on corresponding processor 140B. Each component of processor 140B with a similar name (e.g., app layer, socket layer, etc.) performs similar function as the corresponding component in processor 140A, and the description is not repeated for conciseness.

Application layer 310A contains the set of application instances executed in server system 130. Each of application instances 385A-389A represents an instance of a corresponding application that is executed/run in server system 130 (e.g., a FTP application, a web server application). For example applications 385A and 385B are used to represent two instances of the same application executing in different execution entities, by virtue of sharing the reference numeral 385. Further, application instances 385A-389A may represent end-user applications such as browser applications, word processing applications etc., as well as intermediate applications used primarily in back-end processing such as SSL offload applications.

Socket layer 320A contains sockets 391A-399A. A socket is an endpoint in the TCP connection that is defined by a combination of source and destination IP addresses and port numbers. Each of the sockets 391A-399A is bound to a corresponding application instance (i.e., 385A-389A) to which the TCP connection is mapped to.

For each TCP connection (represented by a socket in socket layer 320A), a corresponding application control block (ACB) is created and maintained in ACB blocks 340A by socket layer 320A. Each block in ACB blocks 340A represents a socket descriptor, and specifies the data delivered by the lower level TCP layer (in the receive direction), or the data yet to be transmitted via the underlying TCP layer (in the send direction).

Each ACB may also contain a Receive Side Scaling (RSS) queue number assigned to the execution entity, which supports data transfers to/from the ACB, and a pointer to a corresponding transmission control block (TCB) that is mapped to the same TCP connection. It is pertinent to note that the corresponding TCB may be mapped in the same execution entity or another execution entity. Further, each ACB block also contains an application identifier (e.g., an app ID), which uniquely identifies the application instance to which the TCP connection is mapped.

TCP layer 330A interfaces with lower layers to ensure that the 'sequence' of data bytes is appropriately received, before delivering the sequence to a higher layer via the corresponding ACB. TCP layer 330A also maintains TCB blocks 350A for maintaining various state information (the byte sequence number, the connection establishment status, etc.), as described in RFC 793 on TCP specification. For each TCP connection, in addition to an ACB (created and maintained in ACB blocks 340A or 340B), a corresponding TCB is created and maintained in TCB blocks 350A.

Each TCB may also contain a Receive Side Scaling (RSS) queue number assigned to the execution entity, which supports data transfers to/from the TCB, as well as a pointer to a corresponding ACB block that is mapped to the same TCP connection. Once a TCP connection is established, a TCB is uniquely bound to a corresponding ACB.

NIC 380 places each incoming data packet in one of queues 375A, 375B, with each queue being specified for respective processor 140A and 140B. NIC 380 may use a classification algorithm to select one of the queues for each TCP connection, and thereafter place a received packet in the specific queue to which the TCP connection is assigned. NIC 380 may be implemented as a vNIC (virtual NIC) supporting multiple MAC/IP addresses, as suited in the corresponding environments.

The description is continued below with some example data structures supporting the description of above.

6. Data Structures

As described above with reference to FIG. 3, for each established TCP connection, there is a corresponding set of data structures, i.e., a TCB and an ACB maintained in respective TCB blocks and ACB blocks. FIGS. 4 and 5 illustrate the manner (logically) in which data is maintained in relation to a TCB and an ACB, in one embodiment. Specifically, FIGS. 4 and 5 show exemplary data structures of a TCB and an ACB respectively, wherein the TCB and ACB are stored in processors executing in different execution entities.

FIG. 4 illustrates the format of a TCB block stored in TCB blocks 350A. Only some of the fields of the TCB block, as relevant to an understanding of the transporting of the corresponding packet, are depicted in the Figure for conciseness. The remaining fields will be apparent based on the applicable standards/RFCs, etc., some of which are noted above.

TCB block TCB100 is shown containing several fields in row 401, with the associated values shown in row 402. Specifically, TCB100 contains address 425, RSS queue number 430, pointer to ACB 435, application ID 440, app-snd-buf 445, and snd-buf 450.

Address 425 represents the memory address of the memory location in a shared memory space of the server system 130 starting which TCB100 is stored. RSS queue number 430 stores the RSS queue number of the executing entity in which TCB100 is stored. Pointer to ACB 435 stores a pointer (matching value in field 525) to the memory location in the shared memory space of the server system 130 where the ACB corresponding to TCB100 is stored. Application ID 440 stores the application identifier of the application instance to which the corresponding TCP connection is mapped to.

App-snd-buf 445 represents the corresponding application's notion of the free buffer space available in the TCP connection's send queue. Snd-buf 450 represents the TCP layer's view of the amount of free buffer space available in the TCP connection's send queue. App-snd-buf 445 and snd-buf 450 may be initialized to the same size (i.e., in bytes) when the TCP connection and corresponding socket are created.

For a particular application mapped to a corresponding TCP connection, the application can en-queue up to buffer size (i.e., in bytes) of app-snd-buf 445. Once the application consumes app-snd-buf bytes of buffer space, it cannot en-queue any more data on the corresponding TCP connection.

The TCP layer informs the respective application of the free space in the send queue using write space events. These write space events contain the number of bytes that have been transmitted and acknowledged by a peer TCP and therefore are free to be used for new data from the application.

Similarly, the TCP layer can create segments up to the buffer size of snd-buf 450 from the data en-queued by the application, for transmission to the peer TCP. Once the TCP layer consumes snd-buf bytes of buffer space, it cannot create any more new segments for that particular transmission.

App-snd-buf 445 is accessed by the corresponding application and snd-buf 450 is accessed by the corresponding TCP layer only in the context of processing the write space events described above. Thus, no locks may be needed between application layer and TCP layer to keep track of the availability of write space.

FIG. 5 illustrates the format of an ACB block stored in ACB blocks 340B. Only some of the fields of the ACB block, as relevant to an understanding of the transporting of the packets on a corresponding TCP packet, are depicted in the Figure for conciseness.

ACB block ACB200 is shown containing several fields in row 501, with the associated values shown in row 502. Specifically, ACB200 contains address 525, RSS queue number 530, pointer to TCB 535, application ID 540, and buffer 545.

Address 525 represents the memory address of the memory location in a shared memory space of the server system 130 starting which ACB200 is stored. RSS queue number 530 stores the RSS queue number of the executing entity in which ACB200 is stored. Pointer to TCB 535 stores a pointer (matching value in field 425) to the memory location in the shared memory space of the server system 130 where the TCB corresponding to ACB200 is stored. Application ID 540 stores the application identifier of the application instance to which the corresponding TCP connection is mapped. Buffer 545 represents the memory storage (in registers, random access memory, etc.) buffering the incoming packets awaiting further processing by socket layer for the corresponding connection. Buffer 545 may merely contain pointers to locations storing the data packets, if any.

As is evident, some of the values stored in row 402 of TCB100 correspond to the values stored in row 502 of ACB200. For example, column 435 points to the memory location of ACB200, which is the value seen in column 525 in the corresponding ACB200. In the reverse order, column 535 points to the memory location of TCB100, which is the value seen in column 425 in the corresponding TCB100.

Further, both column 440 of TCB100 and column 540 of ACB200 identify the same application instance (AID001) as the application instance to which the corresponding TCP connection is mapped to. The RSS queue numbers (shown as 0001 in TCB100 and 0002 in ACB200) also show that the TCB and ACB belong to different execution entities.

Thus, using the example data structures of FIGS. 4 and 5, inter-layer communication of events is facilitated between TCP layer in one execution entity and higher layers in another execution entity. The description is continued with respect to processing of data packets received from external systems.

7. Receiving Packets

The description is continued considering the case of a data packet placed on queue 375A directed to app 385B in processor 140B, by operation of NIC 380. Once the data packet is received by processor 140A, the corresponding TCP layer 360A identifies an applicable one of the TCBs from TCB blocks 350A by comparing the IP addresses and port numbers in the incoming IP packet with those in the respective TCBs. The identified TCB contains a pointer to a corresponding ACB (as shown in field 435 of FIG. 4), using which the corresponding ACB in ACB blocks 340B is identified.

TCP layer 360A then examines the RSS queue number (field 430) of the identified TCB and ACB. Since the TCB and ACB are in two different execution entities, their RSS queue numbers will not match. Therefore, TCP layer 330A places the IP packet in event queue 370B on processor 140B. Although only one event queue 370B is shown in processor 140B for all packets received from TCP layer 330A, a corresponding queue can be provided for each external processor (e.g., 140C, 140D, etc.).

At processor 140B, a poll function implemented on processor 140B polls the event queue 370B from time to time to check the availability of incoming packets. Thus, even if there are many thousands of connections being served by corresponding TCP layers in external processing threads (e.g., in 140A, 140C, etc.), a small number of queues only need to be polled for determining the availability of an outstanding event, which is awaiting further processing.

Once an incoming packet is found, the corresponding ACB (identified by the ACB pointer contained in the TCB of the event message) is updated to reflect the arrival of the packet. For example, an additional pointer may be added to the memory location storing data packet. Accordingly, the data in the data packet is available for the target application according to the socket interface, implemented in a known way.

The description is continued considering the case of a data packet placed on queue 375A, with the data packet being received on a TCP connection directed to application instance (app) 385A in processor 140A. Once the data packet is received by processor 140A, the corresponding TCP layer 360A identifies an applicable one of the TCBs from TCB blocks 350A by comparing the IP addresses and port numbers in the incoming IP packet with those in the respective TCBs. The identified TCB contains a pointer to a corresponding ACB, using which the corresponding ACB in ACB blocks 340A is identified.

TCP layer 360A then examines the RSS queue number of the identified TCB and ACB. Since the TCB and ACB are on the same execution entity, their RSS queue numbers will match. Therefore, TCP layer 330A places the IP packet on path 360A and delivers the packet to socket layer 320A for further processing.

While the description is provided with respect to data packets first processed by processor 140A, it will be readily understood that packets of some other TCP connections may be first placed in queue 375B and first processed by processor 140B. Again, some of such data packets may be delivered to sockets on processor 140A and some of the packets may be delivered to sockets on processor 140B.

As further noted above, each processor may implement a single execution entity processing each TCP packet in a run-to-completion model. For example, the execution entity may have a single loop in which each packet from queue 375A is sequentially processed at the TCP, socket and application layers.

Within the poll function logic, events from 375A (network events/packet arrival events), 360A (TCP layer events) and 370A (socket layer events from socket layer of other execution entities) are processed using some event scheduling mechanism. In poll function logic implemented in either hardware or software; such mechanism could be a round-robin scheduling, a weighted round-robin scheduling or any other suitable mechanism, as may be relevant to the particular environment.

Due to such approaches, it may be appreciated that TCP and higher layers may be implemented without requiring operating system primitives such as interrupts, process blocking and rescheduling (blocking primitives). Accordingly, the features of the example embodiment may be particularly suitable in virtual machines type of environments, where the application developers wish not to rely on operating system vendors for underlying features (provided in operating systems).

The description is continued with respect to processing of data packets transmitted to external systems.

8. Transmitting Packets

The description is continued considering the case of a data packet transmitted by app 385B via socket 391B on queue 370B to TCP layer 330A to be transmitted over queue 375A to an external system (e.g., client 110A).

App 385B invokes a send interface of socket layer 320B (e.g., as a socket API function call) with a packet to transmit and the packet's size in bytes. Upon receiving the packet, socket layer 320B identifies an applicable one of the ACBs from ACB blocks 340B. The identified ACB contains a pointer to a corresponding TCB (as shown in field 535 of FIG. 5), using which the corresponding TCB in TCB blocks 350A is identified.

The socket layer's send interface checks to see if the corresponding TCB's app-snd-buf can accommodate the packet's size. If not, socket layer 320B returns an error to the app 385B, which in turn may attempt to transmit the packet again at a later time. If the app-snd-buf indicates that the corresponding TCB can accommodate the packet, then socket layer 320B passes the packet information (address and size) that it received from the app 385B to TCP layer 330A for transmission.

As described previously, since the ACB and the corresponding TCB have different RSS numbers, an event message is created with the packet information and then queued into 370B (e.g., as a CONN_SEND event). However, if the ACB and the corresponding TCB had the same RSS numbers, then the event message would have been passed to TCP layer 330B using an event function call asynchronously.

Once TCP layer 330A receives the event message, it checks to see if the snd-buf in the corresponding TCB can accommodate the buffer size of the packet. If yes, TCP layer 330A queues the packet into the TCB's transmit queue. If the snd-buf cannot accommodate the incoming packet, then the packet is queued into a backlog queue until the peer TCP acknowledges previously transmitted data and frees the snd-buf space in the TCB. Example parameters corresponding to various event messages generated during receiving and transmitting of packets are shown in the Appendix.

Once transmission is complete, TCP layer 330A places the packet into a queue called ACK queue, which contains segments that are waiting to be acknowledged by the peer TCP. Once the peer TCP acknowledges the reception of the packet, TCP layer 330A frees the packet from the queue. It then creates a write space event to app 385B and places it on queue 370B. The event information contains the number of bytes that have been freed in the ACK queue for that TCP connection.

When app 385B receives the write space event from TCP layer 330A, it adds the information in the event to the app-snd-buf 445 of the corresponding TCB. This is the new space available for app 385B to queue more data.

The above procedure is repeated for all packets that need to be transmitted to an external system. However, instead of transmitting a single packet, a chain or a scatter-gather list of packets can also be transmitted to an external system from applications executing in server system 130.

The multi-processor systems can have more complex configurations than that described above, as illustrated below with additional examples.

9. Alternate Configurations

Figure 6:
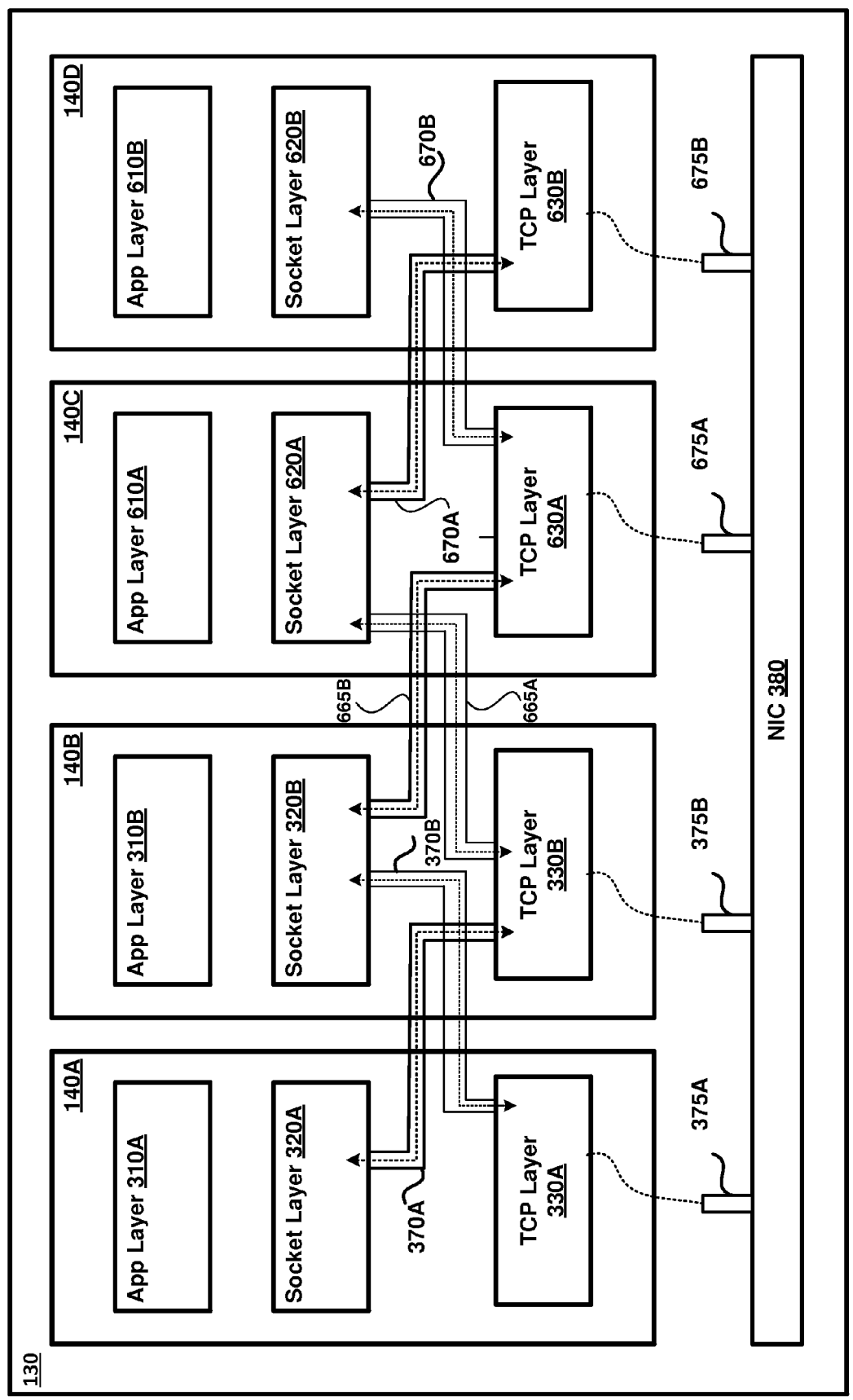
FIG. 6 depicts an alternate configuration of the multiprocessor server system, in an embodiment of the present disclosure.
Figure 7:
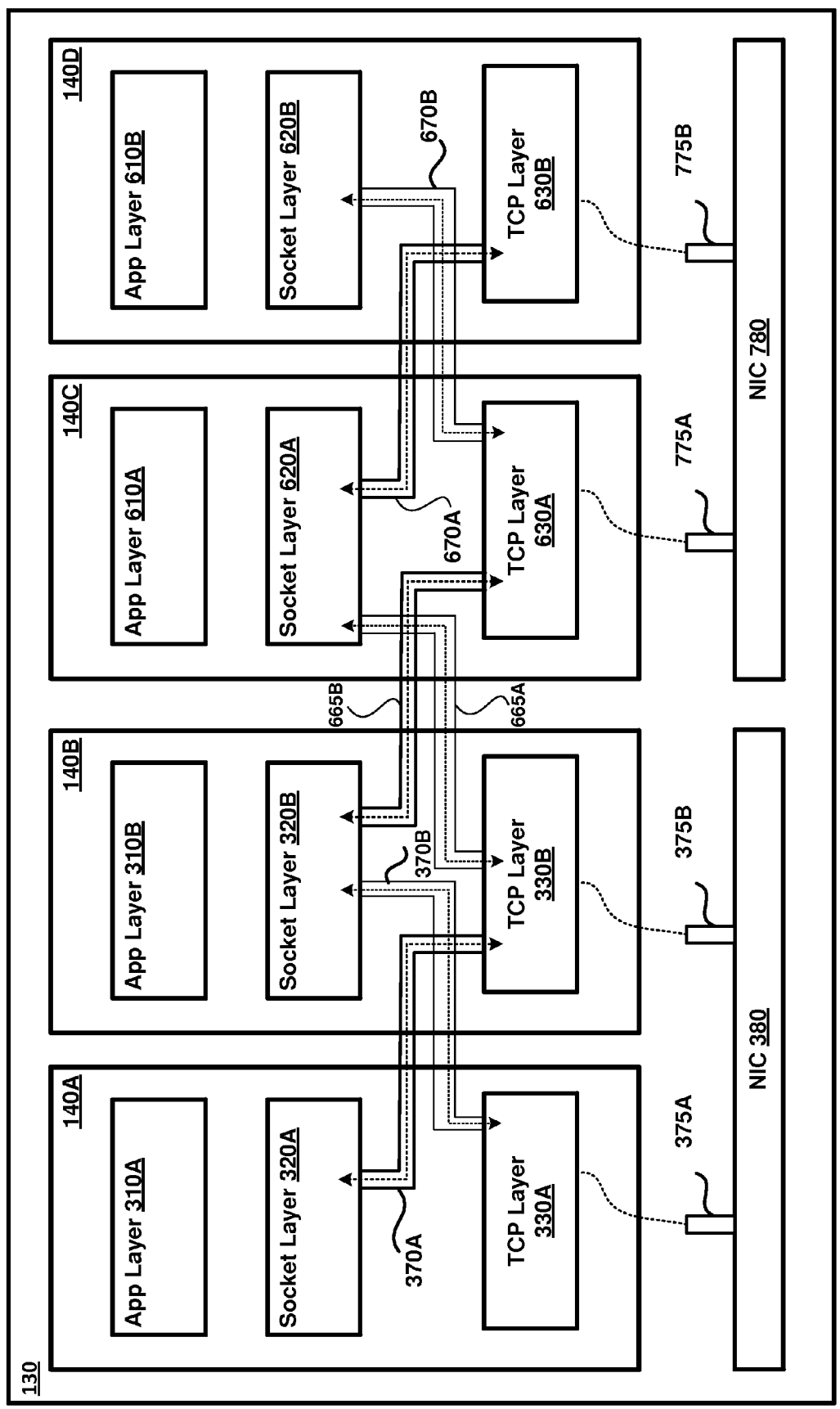
FIG. 7 depicts another alternate configuration of the multiprocessor server system, in an embodiment of the present disclosure.

FIGS. 6 and 7 show alternate configurations of server system 130. In FIG. 6, server system 130 is shown containing processors 140A, 140B, 140C and 140D, and NIC 380. Each block of FIG. 6 is described below in further detail.

Referring to FIG. 6, processors 140A-140D together operate as a multi-processing environment for application instances executing in server system 130. Processors 140A and 140B have been described earlier with FIG. 3. Processor 140C is shown containing application layer 610A, socket layer 620A, TCP layer 630A, and event queue 670A, and processor 140D is shown containing application layer 610B, socket layer 620B, TCP layer 630B, and event queue 670B.

The combination of application layer 610A, socket layer 620A, and TCP layer 630A is implemented (executed) in a third execution entity on corresponding processor 140C Similarly, the combination of application layer 610B, socket layer 620B, and TCP layer 630B is implemented in a fourth execution entity on corresponding processor 140D. Each component of processors 140C and 140D with a similar name (e.g., application layer, socket layer, etc.) performs similar function as the corresponding components in processor 140A, and the description is not repeated for conciseness.

Similar to the event queues 370A and 370B implemented on processors 140A and 140B respectively, one event queue 670A and another event queue 670B is shown in implemented in processors 140C and 140D respectively. Accordingly, for all packets received from TCP layer 630A directed to an application in application layer 610B, TCP layer 630A places the packet in event queue 670B on processor 140D. Similarly, for all packets received from TCP layer 630B directed to an application in application layer 610A, TCP layer 630B places the packet in event queue 670A on processor 140C.

Additionally, event queue 665A is implemented on processor 140C to enable TCP layer 330B to place packets destined to applications on application layer 610A on event queue 665A. Similarly, event queue 665B is implemented on processor 140B to enable TCP layer 630A to place packets destined to applications on application layer 310B on event queue 665B.

In general, for each TCP Layer instance on one execution entity and a socket layer instance on another execution entity, there exists an event queue, thus allowing any TCP layer to queue events to any socket layer and vice versa. This also implies that there exists a complete mesh of event queues between the TCP and socket layer instances between the different execution entities.

Incoming data packets directed to applications on any of the processors 140A-140D are placed on queues 375A, 375B, 675A and 675B by operation of NIC 380, with each queue being specified for respective processor 140A, 140B, 140C, and 140D.

FIG. 7 shows a similar multi-processing environment as shown in FIG. 6, except that the incoming data packets are placed on queues by two NICs. Specifically, incoming data packets directed to applications on processors 140A and 140B are placed on queues 375A and 375B respectively by NIC 380, and incoming data packets directed to applications on processors 140C and 140D are placed on queues 775A and 775B respectively by NIC 780. NIC 780 performs similar function and operation as the corresponding NIC 380 described above, so the description is not repeated for conciseness.

The description is continued with reference to an embodiment where the same application instance is executed in two different execution entities to process a single task.

10. Application Instance Executing on Different Execution Entities

Figure 8:
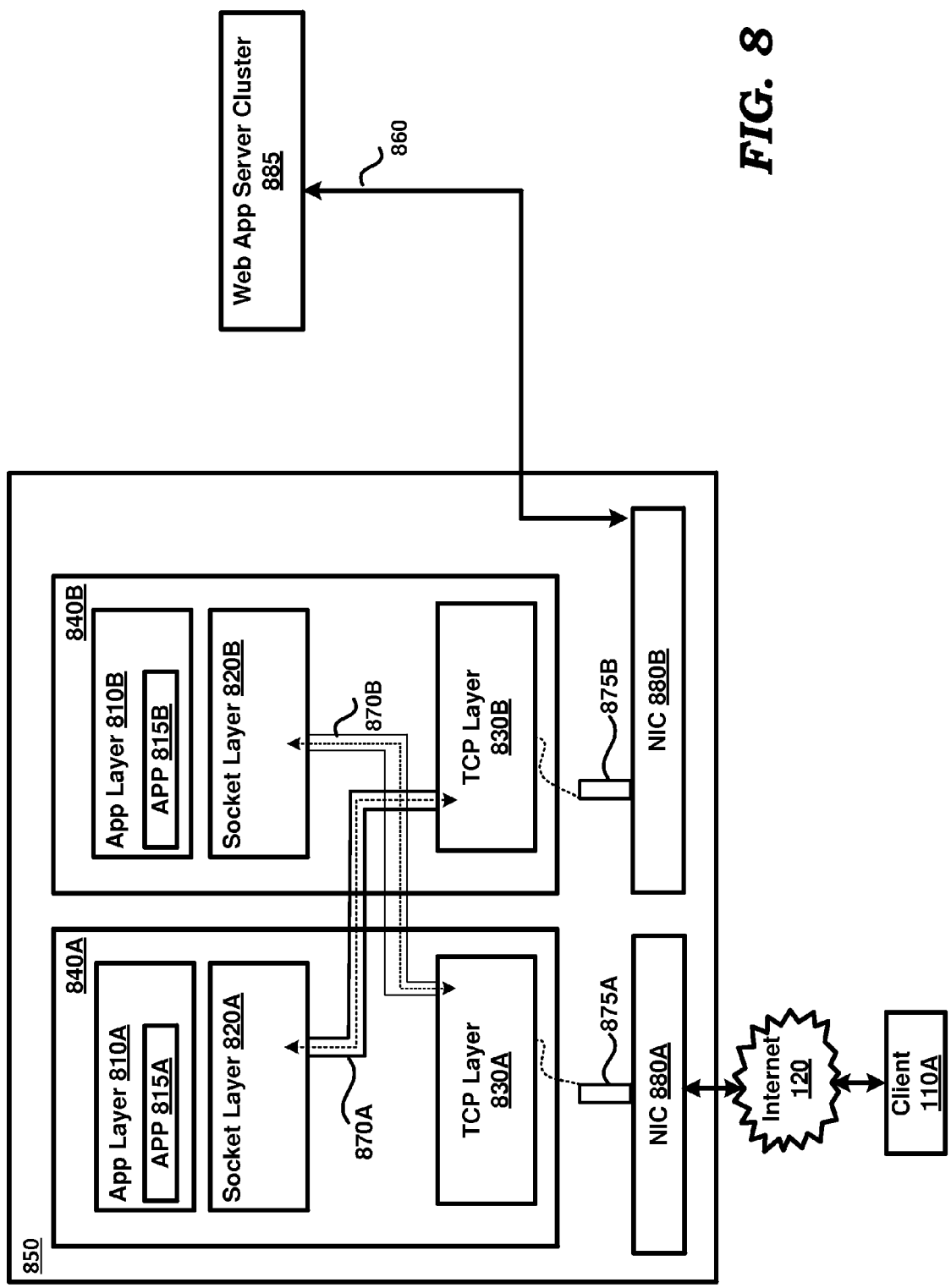
FIG. 8 is a block diagram depicting an example use case of a multiprocessor server system according to an aspect of the present disclosure.

In FIG. 8, server system 850 is shown containing processors 840A and 840B, and NICs 880A and 880B. Each block of FIG. 8 is described below in further detail. As such, server system 850 may be referred to as SSL offload appliance as it performs the task of an SSL offload application described below.

Processors 840A and 840B together operate as a multi-processing environment for application instances executing in SSL offload appliance 850. Processor 840A is shown containing application layer 810A, socket layer 820A, TCP layer 830A, and event queue 870A, and processor 840B is shown containing application layer 810B, socket layer 820B, TCP layer 830B, and event queue 870B.

Each component of processors 840A and 840B with a similar name (e.g., application layer, socket layer, etc.) performs similar function as the corresponding components in processor 140A in FIG. 3, and the description is not repeated for conciseness.

As noted above, there may be situations where a single application may be supported by concurrent/parallel execution on different execution entities, when the same application is required to perform different parts of a single task.

For example, consider the case of a Secure Socket Layer offload application (the "SSL app"), where the application is required to perform the task of decryption and encryption of data. On a high level, the SSL app receives a request from a (remote) client system as an encrypted packet. The SSL app decrypts the packet and sends the embedded request to a back-end server, which in-turn sends a response to the request. The response is encrypted once again by the SSL app and sent back to the requesting client.

In the example of FIG. 8, the SSL app executes as app 815A in application layer 810A and as app 815B in application layer 810B. The SSL app is configured to perform SSL termination (decryption of data and passing on un-encrypted data) on one processor (840A) and SSL encryption on another processor (840B).

NIC 880A receives an encrypted data packet over a first TCP connection from client 110A (via Internet 120). NIC 880A transmits the data packet to TCP layer 830A over queue 875A. TCP layer 830A processes the data packet and sends the encrypted data to corresponding app 815A in application layer 810A using an event function call. App 815A performs SSL termination, whereby app 815A decrypts the encrypted data packet, retrieves the plain text request contained in the packet, and sends the plan text request to TCP layer 830B in processor 840B over a second TCP connection, via an event message on event queue 870A.

TCP layer 830B sends the plain text request (in non-encrypted form) to a back-end server hosted on web app server cluster 885, via NIC 880B and path 860. The back-end server (via the web app server cluster 885) sends a corresponding response (as non-encrypted plain text) to TCP layer 830B. TCP layer 830B then sends the received plain text response to app 815B on application layer 810B as an event function call. App 815B encrypts the plain text response and sends the resultant data packet to TCP layer 830A in processor 840A as an event message on event queue 870B. TCP layer 830A then sends the encrypted data to client 110A via the first TCP connection noted earlier.

Thus, with the same application bound to different processors, the SSL app is enabled to decrypt received data using a first processor, encrypt the response data using another processor, without using any locks in the corresponding TCP, socket or application layers of either of the processors, and thereby enhance the throughput performance of SSL offload appliance 850. Further, having the first processor perform the SSL termination allows SSL offload appliance 850 to bear the load of encryption/decryption processing instead of the back-end servers hosted on web app server cluster 885, allowing the back-end servers to focus resources on the data processing itself and obviating the need to have an encrypted channel along the entire data path (i.e., including path 860) all the way to the back-end servers on web app server cluster 885.

It should be appreciated that the features described above can be implemented in various embodiments as a desired combination of one or more of hardware, executable modules, and firmware. The description is continued with respect to an embodiment in which various features are operative when executable modules are executed.

11. Computer Readable Medium

Figure 9:
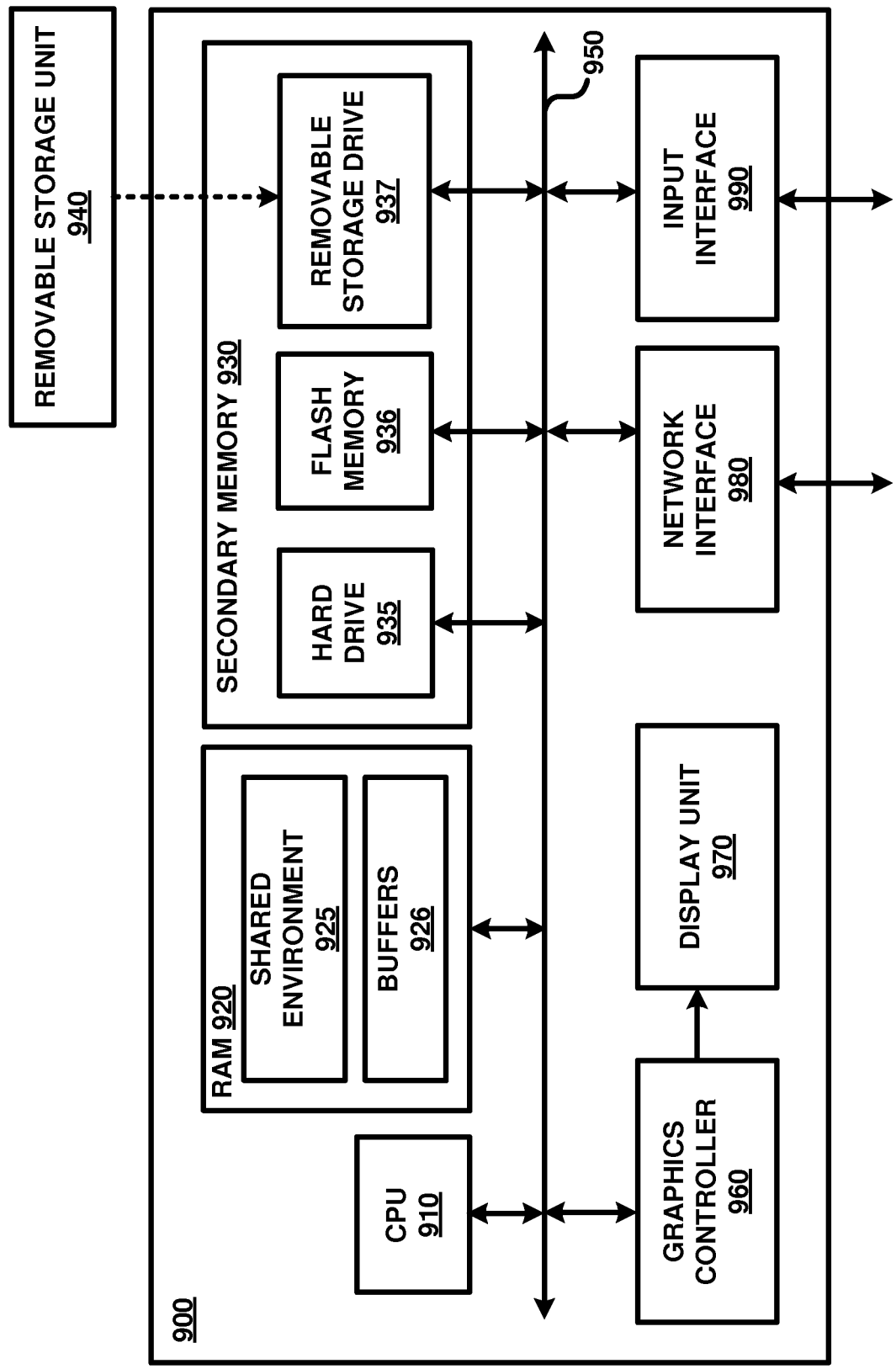
FIG. 9 is a block diagram illustrating the details of a digital processing system in which several aspects of the present disclosure are operative by execution of appropriate executable modules.

FIG. 9 is a block diagram illustrating the details of digital processing system 900 in which various aspects of the present disclosure are operative by execution of appropriate software instructions. Digital processing system 900 may correspond to server system 130.

Digital processing system 900 may contain one or more processors (e.g., processors 140A-140D) as a part of central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units (e.g., processors 140A-140D), with each processing unit potentially being designed for a specific task. Alternatively, CPU 910 may contain only a single general-purpose processing unit supporting multiple processing entities (e.g., logical CPUs).

RAM 920 may receive instructions from secondary memory 930 using communication path 950. RAM 920 is shown currently containing software instructions constituting shared environment 925 and buffers 926 (for storing the TCBs/ACBs, packet buffering of incoming TCP packets, etc.). Shared environment 925 includes operating systems, device drivers, virtual machines, etc., which provide a (common) run time environment for execution of various software blocks.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse) and may be used to provide inputs. Network interface 980 (e.g., NIC 380, NIC 780) provides connectivity to a network (e.g., using Internet Protocol), and may be used to communicate with other systems (such as those shown in FIG. 1, e.g., client systems 110A-110N) connected to the network.

Secondary memory 930 may contain hard drive 935, flash memory 936, and removable storage drive 937. Secondary memory 930 may store the data and software instructions (e.g., for performing the actions noted above with respect to FIG. 2), which enable digital processing system 900 to provide several features in accordance with the present disclosure.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EEPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

12. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX

1. The following message types are declared:
CONN_OPEN - connection open
CONN_SEND - send data over a connection
CONN_CLOSE - close a connection
CONN_RECV - receive data from a connection
CONN_RELEASE - release a connection context
CONN_ABORT - abort a connection
CONN_OPEN_RESP - response to CONN_OPEN
CONN_SEND_RESP - response to CONN_SEND
CONN_RECV_RESP - response to CONN_RECV
CONN_OPEN_COMPLETE - response to CONN_OPEN
CONN_ASYNC_CLOSE - remote TCP closed connection

APPENDIX-continued

CONN_CLOSE_RESP - response to CONN_CLOSE
CONN_ABORT - remote TCP reset connection using TCP RST 2. An Event Message header structure:

```
typedef struct {
unsigned char pad[3];
unsigned char code;
unsigned int length; // length of parameters associated with the command codes
                    // or the response codes
caddr_t data; // the start of parameters for the code
} conn_api_msg_t;
```

3. TCP-to-Socket Event Messages:

A. Event message sent by the TCP layer in response to the conn_open command code from the socket layer.

```
typedef struct {
caddr_t conn;
in_addr_t local_ip;
in_addr_t remote_ip;
unsigned short local_port;
unsigned short remote_port;
unsigned char actv_pasv;
unsigned char pad;
unsigned short sockopts;
unsigned int  error;
unsigned int  appid;
} conn_open_resp_t;
```

B. In case of TCP, the event message below is sent by the TCP layer in when data that was queued for transmission by the socket layer is transmitted and acknowledged by remote TCP. In case of UDP, this is sent when a datagram is queued for transmission with the outgoing network interface.

```
typedef struct {
caddr_t conn;
int length;
int error;
} conn_send_resp_t;
```

C. The event message below is sent by the TCP layer in response to a conn_recv command from Socket Layer.

```
typedef struct {
caddr_t  conn;
pbuf_t   *head;
pbuf_t   *tail;
unsigned int len;
char     pad[4];
} conn_recv_resp_t;
```

D. The event message below is sent by the TCP layer in when a connection is closed or aborted by remote TCP.

```
typedef struct {
caddr_t  conn;
caddr_t  apphandle;
pbuf_t   *head;
pbuf_t   *tail;
unsigned int len;
char     pad[4];
} conn_close_resp_t;
```

4. Socket-to-TCP Event Messages:

A. Event message sent by the socket layer in response to the conn_open command code from the application layer, and when the application makes a "merged socket call" to open a passive or active open TCP connection.

```
typedef struct {
caddr_t   conn;
in_addr_t local_ip;
in_addr_t remote_ip;
unsigned short local_port;
unsigned short remote_port;
unsigned char actv_pasv;
unsigned char pad;
unsigned short sockopts;
unsigned int  error;
unsigned int  appid;
} conn_open_param_t;
```

B. These are the parameters for an event message for conn_send command that are sent to TCP when an application calls send( ) command.

```
typedef struct {
caddr_t  conn;
pbuf_t   *head;
pbuf_t   *tail;
unsigned int   length;
unsigned  char pad[4];
} conn_send_param_t;
```

C. These are the parameters for an event message for conn_close command that are sent to TCP when an application calls close( )/shutdown( ) on a socket.

APPENDIX-continued

```
        typedef struct {
caddr_t    conn;
unsigned   char how;
unsigned   char pad[3];
} conn_close_param_t;
```
D. These are the parameters for an event message for conn_recv command that are sent to TCP when an application calls recv( ) on a socket to read more data from a connection.
```
        typedef struct {
caddr_t    conn;
int        len;
} conn_recv_param_t;
```
E. These are the parameters for an event message sent by the application to the TCP layer to indicate that it can release a TCB/UCB.
```
        typedef struct {
caddr_t    pcb;
} conn_release_cmd_t;
```

What is claimed is:

1. A method of communicating events between different concurrent execution entities in a server system addressable by an Internet Protocol (IP) address on a network, said method comprising:

executing a first Transmission Control Protocol (TCP) layer instance in a first execution entity and a higher layer instance in a second execution entity;

wherein a second TCP layer instance is executed in said second execution entity, and wherein each of said first TCP layer instance and said second TCP layer instance is designed to receive packets on said network with a destination IP field set to said IP address, wherein both of said first execution entity and second execution entity are executed on said server system addressable by said IP address on said network;

receiving, by said first execution entity, a first TCP packet on said network with said IP address in said destination IP field;

generating, by said first TCP layer instance, a first event message by processing of said TCP packet;

storing said first event message in an event queue provided in said server system;

identifying, by said second execution entity, the presence of said event message in said event queue; and updating, by said second execution entity, a first data structure corresponding to processing of said event message by said higher layer instance in said second execution entity.

2. The method of claim 1, wherein said server system is a multi-processor system containing a plurality of processors, wherein said first execution entity is provided in a first processor, said second execution entity is provided in a second processor and a third execution entity is provided in a third processor, said third execution entity implementing a third TCP layer instance, wherein said first processor, said second processor and said third processor are contained in said plurality of processors, wherein said first TCP packet is received on a first connection of a first plurality of TCP connections, wherein a third TCP packet of a third connection of a third plurality of TCP connections is received and processed by said third TCP layer instance, wherein said first plurality of TCP connections and said third plurality of TCP connections terminate at applications supported by said higher layer instance and executing in said second processor, said method further comprises:

queuing in said event queue, a third event message generated by said third TCP layer instance by processing of said third packet, wherein said identifying further comprises polling said event queue for incoming event messages, wherein said polling identifies presence of said first event message and said third event message, wherein said updating updates said first data structure in response to said polling identifying said first event message, said first data structure corresponding to said first connection, wherein said updating updates a third data structure corresponding to said third connection.

3. The method of claim 2, wherein said higher layer instance corresponds to a socket layer supporting said applications executing in said second processor, said method further comprising:

maintaining, by said socket layer, an application control block (ACB) corresponding to each TCP connection of said plurality of TCP connections, wherein said first data structure and said third data structure are a first ACB and a third ACB corresponding to said first TCP connection and said third TCP connection respectively, wherein said updating updates the first ACB in processing said first event message in said event queue without having to implement a lock, and updates the third ACB in processing said third event message in said event queue without having to implement a lock.

4. The method of claim 3, said method further comprising:

maintaining a transmission control block (TCB) corresponding to each TCP connection of said first plurality of TCP connections and said third plurality of TCP connection, wherein the TCBs corresponding to said first plurality of TCP connections are maintained by said first TCP layer instance in said first execution entity, and the TCBs corresponding to said third plurality of TCP connections are maintained by said third TCP layer instance in said third execution entity, wherein each TCB contains an ACB identifier of a corresponding ACB of the same TCP connection, an application identifier of a corresponding application instance at which the TCP connection terminates, wherein each of said first event message and said third event message contain the ACB identifier and the application identifier retrieved from the corresponding TCB, wherein the application identifier is used to deliver the data contained in said first TCP packet and said third TCP packet to corresponding destination application instances.

5. The method of claim 4, wherein each execution entity is assigned a corresponding Receive Side Scaling (RSS) queue number in said multi-processor system, said method further comprising:

examining each TCP packet to determine an associated TCB corresponding to the TCP connection on which the TCP packet is received;

retrieving a first Receive Side Scaling (RSS) queue number from the determined TCB;

comparing, in said first execution entity, said first RSS queue number with a RSS queue number assigned to said first execution entity;

if said first RSS queue number equals the RSS queue number of said first execution entity, invoking an event function call to pass the TCP packet to the socket layer in said first execution entity, if said first RSS queue number does not equal the RSS queue number of said first execution entity, passing the TCP packet as a corresponding event message to the execution entity having a RSS queue number matching said first RSS queue number, wherein said first TCP packet is passed as said first event message for storing in said event queue corresponding to said second execution entity.

6. The method of claim 5, wherein each of said execution entities is implemented in a run-to-completion model in which each TCP packet is processed by said first TCP layer and the socket layer in a single execution run such that the data is delivered to the destination application in said single execution run, wherein each execution entity is also designed to poll for event messages in the corresponding event queue and process each event message also to completion such that the execution entity is implemented without requiring interrupts or process blocking within the processor for processing TCP packets.

7. The method of claim 4, wherein a second application instance in said second execution entity requests sending of a data sequence to an external system via a second socket call, said method further comprising:

identifying a second ACB corresponding to the socket of said second socket call, wherein said second ACB contains a second RSS queue number;

comparing, in said second execution entity, said second RSS queue number with a RSS queue number assigned to said second execution entity;

if said second RSS queue number equals the RSS queue number of said second execution entity, invoking an event function call to pass said data sequence to the TCP layer instance in said second execution entity, if said second RSS queue number does not equal the RSS queue number of said second execution entity, passing said data sequence as a corresponding event message to the execution entity having a RSS queue number matching said second RSS queue number.

8. A non-transitory machine readable medium storing one or more sequences of instructions for enabling a server system to support communication of events between different execution entities in a server system addressable by an Internet Protocol (IP) address on a network, wherein execution of said one or more instructions by one or more processors contained in said server system enables said server system to perform the actions of:

executing a first Transmission Control Protocol (TCP) layer instance in a first execution entity and a higher layer instance in a second execution entity;

wherein a second TCP layer instance is executed in said second execution entity, and wherein each of said first TCP layer instance and said second TCP layer instance is designed to receive packets on said network with a destination IP field set to said IP address, wherein both of said first execution entity and second execution entity are executed on said server system addressable by said IP address on said network;

receiving, by said first execution entity, a first TCP packet on said network with said IP address in said destination IP field;

generating, by said first TCP layer instance, a first event message by processing of said TCP packet;

storing said first event message in an event queue provided in said server system;

identifying, by said second execution entity, the presence of said event message in said event queue; and updating, by said second execution entity, a first data structure corresponding to processing of said event message by said higher layer instance in said second execution entity.

9. The non-transitory machine readable medium of claim 8, wherein said server system is a multi-processor system containing a plurality of processors, wherein said first execution entity is provided in a first processor, said second execution entity is provided in a second processor and a third execution entity is provided in a third processor, said third execution entity implementing a third TCP layer instance, wherein said first processor, said second processor and said third processor are contained in said plurality of processors, wherein said first TCP packet is received on a first connection of a first plurality of TCP connections, wherein a third TCP packet of a third connection of a third plurality of TCP connections is received and processed by said third TCP layer instance, wherein said first plurality of TCP connections and said third plurality of TCP connections terminate at applications supported by said higher layer instance and executing in said second processor, further comprising:

queuing in said event queue, a third event message generated by said third TCP layer instance by processing of said third packet, wherein said identifying further comprises polling said event queue for incoming event messages, wherein said polling identifies presence of said first event message and said third event message, wherein said updating updates said first data structure in response to said polling identifying said first event message, said first data structure corresponding to said first connection, wherein said updating updates a third data structure corresponding to said third connection.

10. The non-transitory machine readable medium of claim 9, wherein said higher layer instance corresponds to a socket layer supporting said applications executing in said second processor, further comprising:

maintaining, by said socket layer, an application control block (ACB) corresponding to each TCP connection of said plurality of TCP connections, wherein said first data structure and said third data structure are a first ACB and a third ACB corresponding to said first TCP connection and said third TCP connection respectively, wherein said updating updates the first ACB in processing said first event message in said event queue without having to implement a lock, and updates the third ACB in processing said third event message in said event queue without having to implement a lock.

11. The non-transitory machine readable medium of claim 10, further comprising:

maintaining a transmission control block (TCB) corresponding to each TCP connection of said first plurality of TCP connections and said third plurality of TCP connection, wherein the TCBs corresponding to said first plurality of TCP connections are maintained by said first TCP layer instance in said first execution entity, and the TCBs corresponding to said third plurality of TCP connections are maintained by said third TCP layer instance in said third execution entity, wherein each TCB contains an ACB identifier of a corresponding ACB of the same TCP connection, an application identifier of a corresponding application instance at which the TCP connection terminates, wherein each of said first event message and said third event message contain the ACB identifier and the application identifier retrieved from the corresponding TCB, wherein the application identifier is used to deliver the data contained in said first TCP packet and said third TCP packet to corresponding destination application instances.

12. The non-transitory machine readable medium of claim 11, wherein each execution entity is assigned a corresponding Receive Side Scaling (RSS) queue number in said multi-processor system, further comprising:

examining each TCP packet to determine an associated TCB corresponding to the TCP connection on which the TCP packet is received;

retrieving a first Receive Side Scaling (RSS) queue number from the determined TCB;

comparing, in said first execution entity, said first RSS queue number with a RSS queue number assigned to said first execution entity;

if said first RSS queue number equals the RSS queue number of said first execution entity, invoking an event function call to pass the TCP packet to the socket layer in said first execution entity, if said first RSS queue number does not equal the RSS queue number of said first execution entity, passing the TCP packet as a corresponding event message to the execution entity having a RSS queue number matching said first RSS queue number, wherein said first TCP packet is passed as said first event message for storing in said event queue corresponding to said second execution entity.

13. The non-transitory machine readable medium of claim 11, wherein a second application instance in said second execution entity requests sending of a data sequence to an external system via a second socket call, further comprising:

identifying a second ACB corresponding to the socket of said second socket call, wherein said second ACB contains a second RSS queue number;

comparing, in said second execution entity, said second RSS queue number with a RSS queue number assigned to said second execution entity;

if said second RSS queue number equals the RSS queue number of said second execution entity, invoking an event function call to pass said data sequence to the TCP layer instance in said second execution entity, if said second RSS queue number does not equal the RSS queue number of said second execution entity, passing said data sequence as a corresponding event message to the execution entity having a RSS queue number matching said second RSS queue number.

14. A server system addressable by an Internet Protocol (IP) address on a network, said server system comprising:

one or more processing units; and a random access memory (RAM) to store instructions, wherein said one or more processing units retrieve said instructions and execute said instructions, wherein execution of said instructions causes said server system to perform the actions of:

executing a first Transmission Control Protocol (TCP) layer instance in a first execution entity and a higher layer instance in a second execution entity;

wherein a second TCP layer instance is executed in said second execution entity, and wherein each of said first TCP layer instance and said second TCP layer instance is designed to receive packets on said network with a destination IP field set to said IP address, wherein both of said first execution entity and second execution entity are executed on said server system addressable by said IP address on said network;

receiving, by said first execution entity, a first TCP packet on said network with said IP address in said destination IP field;

generating, by said first TCP layer instance, a first event message by processing of said TCP packet;

storing said first event message in an event queue provided in said server system;

identifying, by said second execution entity, the presence of said event message in said event queue; and updating, by said second execution entity, a first data structure corresponding to processing of said event message by said higher layer instance in said second execution entity.

15. The server system of claim 14, wherein said one or more processing units correspond to a plurality of processors, wherein said first execution entity is provided in a first processor, said second execution entity is provided in a second processor and a third execution entity is provided in a third processor, said third execution entity implementing a third TCP layer instance, wherein said first processor, said second processor and said third processor are contained in said plurality of processors, wherein said first TCP packet is received on a first connection of a first plurality of TCP connections, wherein a third TCP packet of a third connection of a third plurality of TCP connections is received and processed by said third TCP layer instance, wherein said first plurality of TCP connections and said third plurality of TCP connections terminate at applications supported by said higher layer instance and executing in said second processor, wherein said actions further comprise:

queuing in said event queue, a third event message generated by said third TCP layer instance by processing of said third packet, wherein said identifying further comprises polling said event queue for incoming event messages, wherein said polling identifies presence of said first event message and said third event message, wherein said updating updates said first data structure in response to said polling identifying said first event message, said first data structure corresponding to said first connection, wherein said updating updates a third data structure corresponding to said third connection.

16. The server system of claim 15, wherein said higher layer instance corresponds to a socket layer supporting said applications executing in said second processor, wherein said actions further comprise:

maintaining, by said socket layer, an application control block (ACB) corresponding to each TCP connection of said plurality of TCP connections, wherein said first data structure and said third data structure are a first ACB and a third ACB corresponding to said first TCP connection and said third TCP connection respectively, wherein said updating updates the first ACB in processing said first event message in said event queue without having to implement a lock, and updates the third ACB in processing said third event message in said event queue without having to implement a lock.

17. The server system of claim 16, wherein said actions further comprise:

maintaining a transmission control block (TCB) corresponding to each TCP connection of said first plurality of TCP connections and said third plurality of TCP connection, wherein the TCBs corresponding to said first plurality of TCP connections are maintained by said first TCP layer instance in said first execution entity, and the TCBs corresponding to said third plurality of TCP connections are maintained by said third TCP layer instance in said third execution entity, wherein each TCB contains an ACB identifier of a corresponding ACB of the same TCP connection, an application identifier of a corresponding application instance at which the TCP connection terminates, wherein each of said first event message and said third event message contain the ACB identifier and the application identifier retrieved from the corresponding TCB, wherein the application identifier is used to deliver the data contained in said first TCP packet and said third TCP packet to corresponding destination application instances.

18. The server system of claim 17, wherein each execution entity is assigned a corresponding Receive Side Scaling (RSS) queue number, wherein said actions further comprise:

examining each TCP packet to determine an associated TCB corresponding to the TCP connection on which the TCP packet is received;

retrieving a first Receive Side Scaling (RSS) queue number from the determined TCB;

comparing, in said first execution entity, said first RSS queue number with a RSS queue number assigned to said first execution entity;

if said first RSS queue number equals the RSS queue number of said first execution entity, invoking an event function call to pass the TCP packet to the socket layer in said first execution entity, if said first RSS queue number does not equal the RSS queue number of said first execution entity, passing the TCP packet as a corresponding event message to the execution entity having a RSS queue number matching said first RSS queue number, wherein said first TCP packet is passed as said first event message for storing in said event queue corresponding to said second execution entity.

19. The server system of claim 18, wherein each of said execution entities is implemented in a run-to-completion model in which each TCP packet is processed by said first TCP layer and the socket layer in a single execution run such that the data is delivered to the destination application in said single execution run, wherein each execution entity is also designed to poll for event messages in the corresponding event queue and process each event message also to completion such that the execution entity is implemented without requiring interrupts or process blocking within the processor for processing TCP packets.

20. The server system of claim 17, wherein a second application instance in said second execution entity requests sending of a data sequence to an external system via a second socket call, wherein said actions further comprise:

identifying a second ACB corresponding to the socket of said second socket call, wherein said second ACB contains a second RSS queue number;

comparing, in said second execution entity, said second RSS queue number with a RSS queue number assigned to said second execution entity;

if said second RSS queue number equals the RSS queue number of said second execution entity, invoking an event function call to pass said data sequence to the TCP layer instance in said second execution entity, if said second RSS queue number does not equal the RSS queue number of said second execution entity, passing said data sequence as a corresponding event message to the execution entity having a RSS queue number matching said second RSS queue number.

* * * * *

UNITED STATES PATENT AND TRADEMARK OFFICE
CERTIFICATE OF CORRECTION

PATENT NO. : 9,929,968 B2
APPLICATION NO. : 14/662270
DATED : March 27, 2018
INVENTOR(S) : Narasimhamurthy Page 1 of 1

It is certified that error appears in the above-identified patent and that said Letters Patent is hereby corrected as shown below:

In the Specification

Column 11, Line 20, after "330A" insert -- , --.

Column 12, Line 29, after "140C" insert -- . --.

In the Claims

Column 19, Line 25, Claim 1, delete "entity;" and insert -- entity, --, therefor.

Column 21, Line 67, Claim 8, delete "entity;" and insert -- entity, --, therefor.

Column 24, Line 14, Claim 14, delete "entity;" and insert -- entity, --, therefor.

Signed and Sealed this
Twenty-eighth Day of August, 2018

Andrei Iancu
*Director of the United States Patent and Trademark Office*